United States Patent [19]

Oyoun

[11] 3,921,692
[45] Nov. 25, 1975

[54] PNEUMATIC TIRE BREAKER ASSEMBLY
[75] Inventor: Sami Oyoun, Aachen, Germany
[73] Assignee: Uniroyal A.G., Aachen, Germany
[22] Filed: Sept. 27, 1974
[21] Appl. No.: 509,759

[30] Foreign Application Priority Data
Dec. 19, 1973  Germany............................ 2363296

[52] U.S. Cl. ........................ 152/361 FP; 152/361 R
[51] Int. Cl.² ........................................... B60C 9/18
[58] Field of Search.... 152/361 R, 361 FP, 361 DM

[56] References Cited
UNITED STATES PATENTS
3,612,135  10/1971  Wittneben...................... 152/361 FP
3,831,656  8/1974  Senger et al..................... 152/361 DM
3,834,439  9/1974  Mirtain........................... 152/361 FP Primary Examiner—Drayton E. Hoffman
Assistant Examiner—Larry H. Martin
Attorney, Agent, or Firm—Philip Sands, Esq.

[57] ABSTRACT

A breaker assembly for interposition between the carcass and tread of a pneumatic tire, is disclosed. The breaker assembly is substantially annular and comprises a single ply having a first pair of fold regions which divides the ply into a substantially Z- or S-shaped array of three webs superposed upon and axially continuous with one another, and a second pair of fold regions which further divides the ply into two additional webs each of which axially terminates in a circumferential edge and is superposed upon at least one of the aforementioned three webs.

9 Claims, 10 Drawing Figures

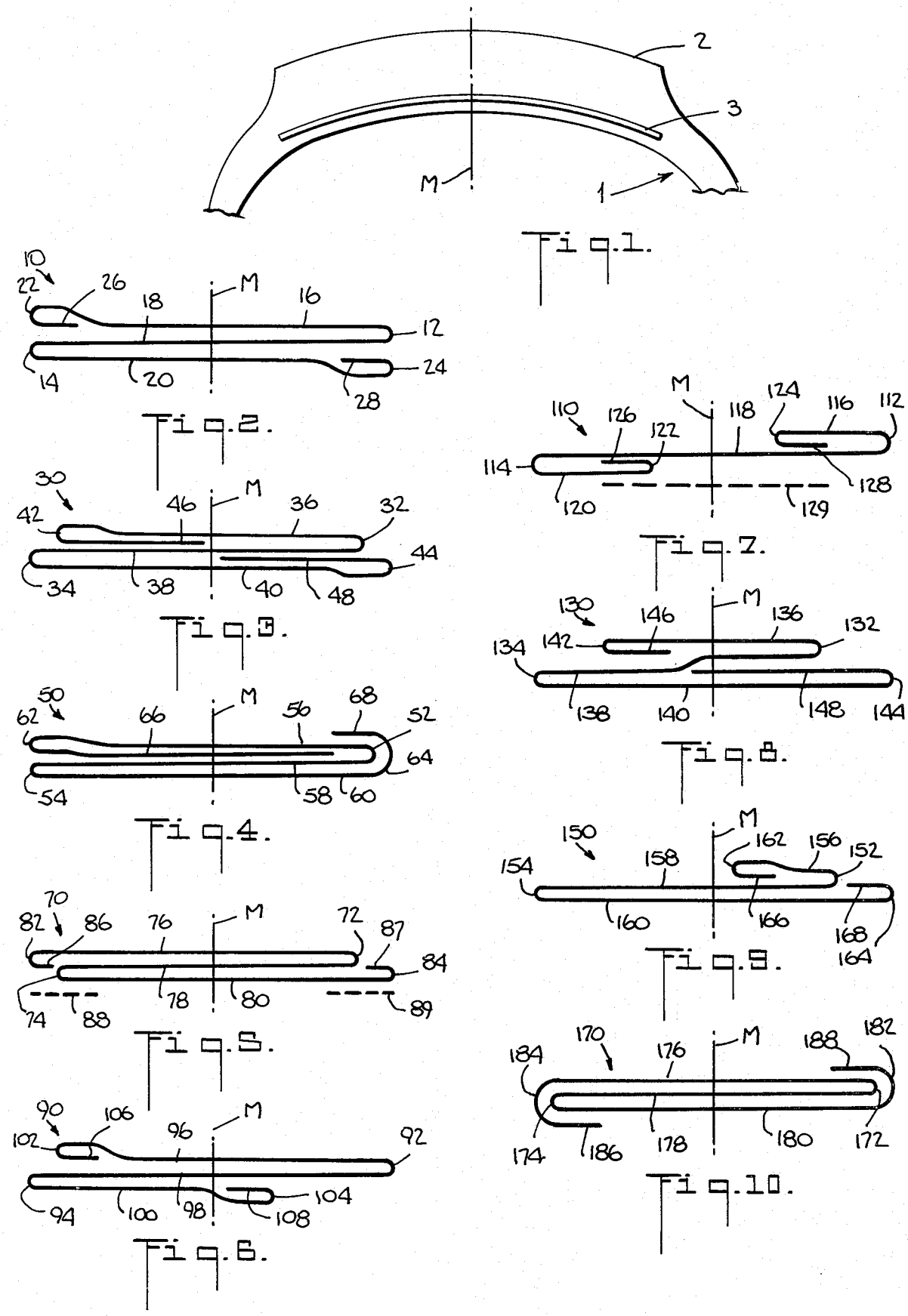

PNEUMATIC TIRE BREAKER ASSEMBLY

BACKGROUND OF THE INVENTION

The present invention relates generally to pneumatic tires, and more particularly to a breaker assembly for interposition between the carcass and tread of a pneumatic tire.

Pneumatic tire, whether they be of the "bias" ply variety or of the "radial" ply variety, are generally constructed with a breaker assembly constituted of one or more plies interposed between the crown region of the carcass and the tread overlying the crown region of the carcass. Depending upon the particular construction and design of a breaker assembly, the pneumatic tire provided with that breaker assembly will display various cornering, skidding and other stability-related characteristics at various speeds and road-surface conditions.

Such characteristics displayed by a rolling pneumatic tire are effected in large measure by the degree of symmetry or asymmetry in the construction of the breaker assembly (hereinafter "breaker") it is provided with, the degree of overall rigidity of that breaker and the relative juxtaposition of those portions of that breaker which are relatively flexible in comparison to those portions of that breaker which are relatively rigid.

Conventional multi-ply breakers often separate from one another beginning along their adjoining edge portions when utilized for a protracted duration at high speeds. As a result, tire manufacturers have been increasingly utilizing breakers constituted of at least one ply which in cross-section is generally Z- or S-shaped, thereby presenting three webs (ply portions) superposed upon one another and capable of better resisting separation from one another because of the single or integral ply construction thereof. However, the conventional Z- or S-shaped breaker does not itself offer an optimum number of variations with respect to the degree of asymmetry and/or rigidity it can be designed to display for compensating for various roadsurface conditions without substantial modification of and digression from its Z- or S-shaped construction.

SUMMARY OF THE INVENTION

Accordingly, it is an object of the present invention to provide a novel and effective breaker for pneumatic tires which in part has a basic Z- or S-shaped cross-section, but which has only two additional portions which need only be slightly altered in span to effect a substantial change in the asymmetry and rigidity of the breaker.

It is a further object of the present invention to provide a breaker assembly for pneumatic tires which effectively counters edge separation and obviates the necessity for additional separate plies for reinforcing certain of the more flexible regions thereof.

To this end, the present invention is a breaker comprised of a single ply having four fold regions which divide the ply into five webs, three of which in cross-section define a generally Z- or S-shaped array which is reinforced by two further webs arranged in superposed relation with the aforementioned three webs. The aforementioned two additional webs, as well as the aforementioned three webs which define the Z- or S-shaped array may each be altered slightly with respect to their respective axial spans and their respective locations relative to a median equatorial plane of the tire. Thus, the breaker asymmetry may be readily altered for optimumly accommodating various selected road-conditions.

BRIEF DESCRIPTION OF THE DRAWINGS

The above and additional objects and advantages of this invention will be more clearly understood from the following detailed description thereof when read in conjunction with the accompanying drawings, in which:

FIG. 1 is a fragmentary, schematic view illustrating a breaker-reinforced pneumatic tire; and FIGS. 2 through 10 illustrate respective embodiments of the breaker assembly pursuant to the present invention.

DETAILED DESCRIPTION OF THE INVENTION

Referring now to the drawings, and more particularly to FIG. 1, the present invention relates to a pneumatic tire 1 having a tread 2 overlying its crown region, and a cord-reinforced breaker 3 interposed between the tread 2 and the carcass crown region of the tire 1. Particularly, the present invention is chiefly associated with the fold construction of the breaker 3, wherein the opposite axially outermost regions thereof do not present freely exposed cord-displaying circumferential edges.

Nine embodiments of the present invention are illustrated respectively in FIGS. 2–10. Each of the breakers are substantially annular and comprise preferably a single ply having two pairs of fold regions which divide the ply into five axially continuous webs superposed upon one another. Three of the webs in cross-section define a substantially S-shaped array.

The first breaker embodiment 10, in FIG. 2, is provided with a first pair of fold regions 12 and 14 which divides it into three webs 16, 18 and 20 superposed upon one another and presenting a substantially Z- or S-shaped array. The breaker 10 is furthermore provided with a second pair of fold regions 22 and 24 which further divides it into two additional webs 26 and 28. The web 26 is tucked in between the webs 16 and 18, and the web 28 is tucked in between the webs 18 and 20. The webs 26 and 28 are of identical axial span and terminate in respective circumferential edges which are equidistantly spaced from the median equatorial plane M of the breaker 10, and for that matter of the entire pneumatic tire 1 (FIG. 1). Preferably, as illustrated in FIG. 2, the breaker 10 is so constructed that the fold regions 12 and 24 are equidistantly spaced from the median equatorial plane M, and the fold regions 14 and 22 are similarly equidistantly spaced from the median equatorial plane M.

In FIG. 3 there is illustrated a second embodiment of the breaker of the present invention, the latter embodiment being denoted by the reference character 30. The breaker 30 is provided with a first pair of fold regions 32 and 34 which divides it into three webs 36, 38 and 40 superposed upon one another and defining substantially a Z- or S-shaped array. Furthermore, the breaker 30 is provided with a second pair of fold regions 42 and 44 which divides it into two additional webs 46 and 48, the web 46 being tucked in between the webs 36 and 38, and the web 48 being tucked in between the webs 38 and 40. The webs 46 and 48 have respective edges which terminate at the median equatorial plane M of the breaker 30, but differ in their respective axial spans. This is because the fold regions 34 and 44 are equidistantly spaced from the median equatorial plane M and cooperatively define the maximum axial span of the breaker 30, whereas the fold regions 32 and 42 although equidistantly spaced from the median equatorial plane M are more proximate to the median equatorial plane M than are the fold regions 34 and 44.

The embodiment of FIG. 4, namely the breaker 50, is provided with a first pair of fold regions 52 and 54 which divides it into three plies 56, 58 and 60 each superposed upon the other and defining a substantially Z- or S-shaped array. The breaker 50 is furthermore provided with a second pair of fold regions 62 and 64 which divides it into two additional webs 66 and 68, the web 66 being tucked in between the webs 56 and 58, and the web 68 simply overlying in part the web 56. The terminal webs 66 and 68 have respective edges each of which is to one side of the median equatorial plane M of the breaker 50, the web 66 being substantially longer or having an axial span which is substantially greater than that of the web 68.

The embodiment illustrated in FIG. 5, namely the breaker 70, is provided with a first pair of fold regions 72 and 74 which divides the breaker 70 into three webs 76, 78 and 80 superposed upon one another and defining in cross-section a generally Z- or S-shaped array. The breaker 70 is furthermore provided with a second pair of fold regions 82 and 84 which divides it into a pair of additional webs 86 and 87 having identical axial spans and exposed with respect to the webs 76, 78 and 80. The web 86 is superposed upon the web 76, whereas the web 87 is superposed upon the web 80. Furthermore, each of the webs 86 and 87 is equidistantly spaced from the median equatorial plane M of the breaker 70. If desired, the breaker 70 may include an additional pair of co-planar but separate reinforcing plies 88 and 89, the ply 88 opposite the web 86, and the ply 89 opposite the web 87.

The embodiment illustrated in FIG. 6, namely the breaker 90, is provided with a first pair of fold regions 92 and 94 which divides it into three webs 96, 98 and 100 superposed upon one another and defining, in cross section, a generally Z- or S-shaped array. The embodiment 90 is furthermore provided with a second pair of fold regions 102 and 104 which divides it into a pair of tucked-in webs 106 and 108. In this instance, the web 106 is more remote from the median equatorial plane M of the breaker 90 than is the web 108.

The embodiment illustrated in FIG. 7, namely the breaker 110, is provided with a first paid of fold regions 112 and 114 which divides it into three webs 116, 118 and 120 superposed upon one another and defining, in cross section, a generally Z- or S-shaped array. The breaker 110 is furthermore provided with a second pair of fold regions 122 and 124 which divides it into two tucked-in webs 126 and 128 each having an identical axial span and equidistantly spaced from the median equatorial plane M of the breaker 110. If desired, the breaker 110 may be additionally provided with a separate reinforcing ply 129 which generally bridges the gap between the webs 126 and 128.

The embodiment illustrated in FIG. 8, namely the breaker 130, is provided with a first pair of fold regions 132 and 134 which divides it into three webs 136, 138 and 140 superposed upon one another and generally defining, in cross-section, a Z- or S-shaped array. The breaker 130 is also provided with a second pair of fold regions 142 and 144 which divides it into two tucked-in webs 146 and 148. The webs 146 and 148 terminate in respective edges each of which is to the same (in this instance, to the left) side of the median equatorial plane M of the breaker 130, the web 148 being substantially longer than or having an axial span which is substantially greater than that of the web 146.

The embodiment illustrated in FIG. 9, namely the breaker 150, is provided with a first pair of fold regions 152 and 154 which divides it into three webs 156, 158 and 160 superposed upon one another and defining, in cross-section, a generally Z- or S-shaped array. The breaker 150 is furthermore provided with a second pair of fold regions 162 and 164 which divides it into two additional webs 166 and 168 having preferably, although not necessarily, identical axial spans. The webs 166 and 168 furthermore terminate in respective edges each of which is to the same side of the median equatorial plane M of the breaker 150, in this instance only the web 166 being tucked-in.

The embodiment illustrated in FIG. 10, namely the breaker 170, is provided with a first pair of fold regions 172 and 174 which divides it into three webs 176, 178 and 180 superposed upon one another and defining, in cross-section, a generally Z-or S-shaped array. The breaker 170 is furthermore provided with a second pair of fold regions 182 and 184 which divides it further into two additional webs 186 and 188. The webs 186 and 188 overlie the webs 180 and 176, respectively, at least in part. Preferably, the webs 186 and 188 have identical axial spans and are equidistantly spaced from the median equatorial plane M of the breaker 170.

As may be well appreciated from the various embodiments illustrated in FIGS. 2–10, different degrees of asymmetry may be achieved from the breaker of the present invention for compensating, via its selective regions of juxtaposed rigidity and flexibility, various road-surface conditions with optimum stability and traction. This is accomplished by a single breaker having four fold regions and five webs, three of the webs defining a generally Z- or S-shaped array, the other two being readily alterable with regard to their respective locations and axial spans.

For example, in FIGS. 2 and 10, each breaker has a substantially uniform rigidity throughout its midregion, yet has a slightly greater rigidity at its axially opposite ends. In FIG. 3, the breaker 30 has a slightly greater flexibility at its axially opposite ends. Similarly, in FIG. 5, the breaker 70 has greater flexibility at its axially opposite ends. in FIG. 4, the eccentricity of the breaker 50 is such that it displays a greater rigidity to the right of the median equatorial plane M thereof, especially if, although not shown, the webs 66 and 68 were to overlap one another. In FIGS. 6–9, the respective breakers so illustrated emphasize the various degrees of eccentricity that may be achieved for selectively varying the juxtaposed regions of rigidity and flexibility with only nominal alterations to the span of the terminal webs.

It will be understood that the foregoing description of the preferred embodiments of the present invention is for purposes of illustration only, and that the various structural and operational features and relationships herein disclosed are susceptible to a number of modifications and changes none of which entails any departure from the spirit and scope of the present invention as defined in the hereto appended claims.

What is claimed is

1. A breaker for interposition between the carcass and tread of a pneumatic tire, the breaker being substantially annular and comprising a ply having (a) a first pair of fold regions which divides said ply into a substantially S-shaped array of three axially continuous webs superposed upon one another at least partially, and (b) a second pair of fold regions which further divides said ply into two additional webs axially continuous with said three webs and terminating each in a respective circumferential edge separated and lying in a different circumferential plane from the other, at least one of said two additional webs and its corresponding circumferential edge being interposedly tucked in between and concealed by a selected two of said three webs.

2. A breaker as claimed in claim 1, wherein at least one of said two additional webs overlies and is exposed with respect to said three webs.

3. A breaker as claimed in claim 1, wherein at least one of said fold regions of said second pair is disposed axially between said first pair of fold regions.

4. A breaker as claimed in claim 1, wherein at least one of said fold regions of said second pair is disposed axially beyond an adjacent one of said fold regions of said first pair.

5. A breaker as claimed in claim 1, wherein said fold regions of said second pair are equidistantly spaced from the median equatorial plane of the breaker.

6. A breaker as claimed in claim 1, wherein said two additional webs have different axial spans.

7. A breaker as claimed in claim 1, wherein said three webs have different axial spans.

8. A breaker as claimed in claim 1, wherein said second pair of fold regions is entirely to one side of the median equatorial plane of the breaker.

9. A breaker as claimed in claim 1, in combination with and vulcanized to said carcass and tread.

* * * * *